9803X
D. H. Bond,
Shoe Upper.
Patented June 30, 1836.
Round toed Shoe made up.
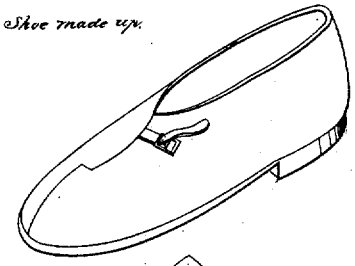
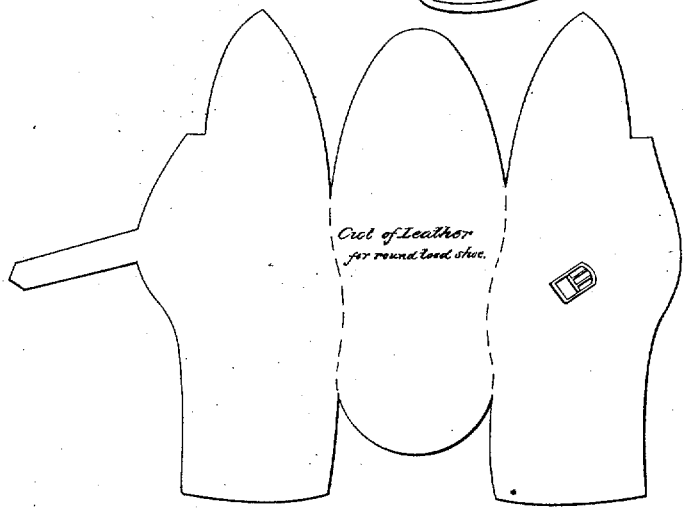
Square toed Shoe made up.
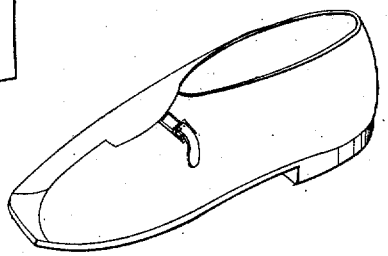
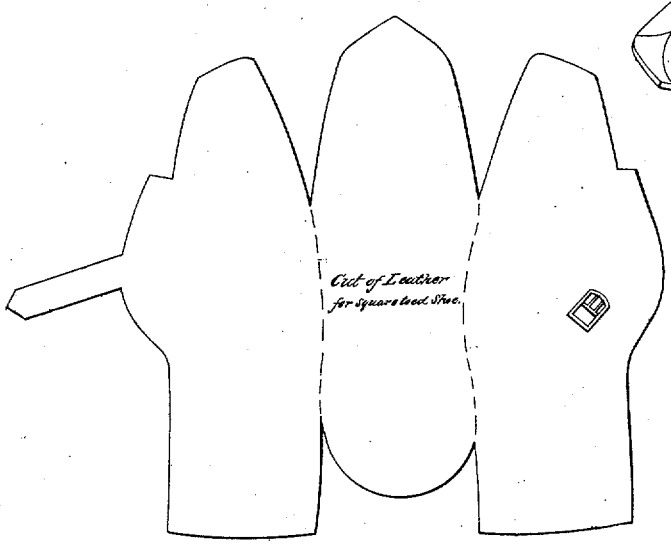
H. PETERS, PHOTO-LITHOGRAPHER, WASHINGTON, D. C.

Daniel H. Bond of Canterbury, Connecticut
Letters Patent 9803X
(507)

The Schedule referred to in these Letters Patent, and making part of the same, containing a description in the words of the said Daniel H. Bond himself, of his Improvement in the manufacture of Ladies and Gentlemens Leather over Shoes.

---

To all to whom these presents shall come.

Be it known that I, Daniel H. Bond of Canterbury, in the County of Windham and State of Connecticut have invented a new and useful improvement in the making, or manufacturing, of Ladies and Gentlemens over shoes of leather which invention is as follows. The leather should be dressed in the same manner as harness or bridle leather, and from [illegible] to 1/8 of an inch in thickness. The shoe contains but one piece of leather the upper and soal joining between the heel and the ball, there is a seam joining the soal and the upper from the ball to the centre of the toe if round, or if the toe is to be made square, the soal is cut about one inch longer than the last, made pointed and turned over the end of the last, so that those seams connecting the soal and the upper, will turn at the corners of the toe and meet in a point on the top of the shoe about one inch from each corner, from this point a seam extends about two inches towards the instep on the top of the shoe, at the termination of this seam the leather laps about one inch and is stitched or laced twice across. from this stitching or lacing the upper is left open to the top, the leather as before observed lapping over the instep about one inch and is secured with a strap and buckle – the quarters at the heel are
closed up similer to the quarters of a common shoe, there
is a short seam joining the seal to the quarters around
the back part of the heel – The shoe is closed in the
wrong side and turned which is easealy done dipping
it in warm watter, it is then lasted while wet and
dried on the last a heel may be put to it with pegs
or nails. When the shoe is perfectly dry, the last is ta-
ken out, and an iner sole or lining cemented to the bot-
tom on the inside, the shoe may then be made watter
proof, by Indian Rubber prepared in the following
way. Take one Gallon of the Oil of tar, and put into
it about 6 ounces of Indian Rubber cut into small
pieces, set it in a warm place and stir it occa-
sionally untill the Rubber is dissolved; give
the Shoe two or three good coats of this both
inside and out and it is perfectly impervious
to watter. Common rosin softened with the
above preparation makes a verry good cement
for the inar sole or lining.

In witness whereof I have unto sub-
scribe my name the 27th April 1836.

Witnesses
Rufus L. Dimmick
David A. Adams.

Daniel H. Bond

[illegible]

(510 [illegible])